Jan. 10, 1961 A. B. HILL ET AL 2,967,538
PROPORTIONING SYSTEM FOR WATER TREATERS
Filed Dec. 26, 1958
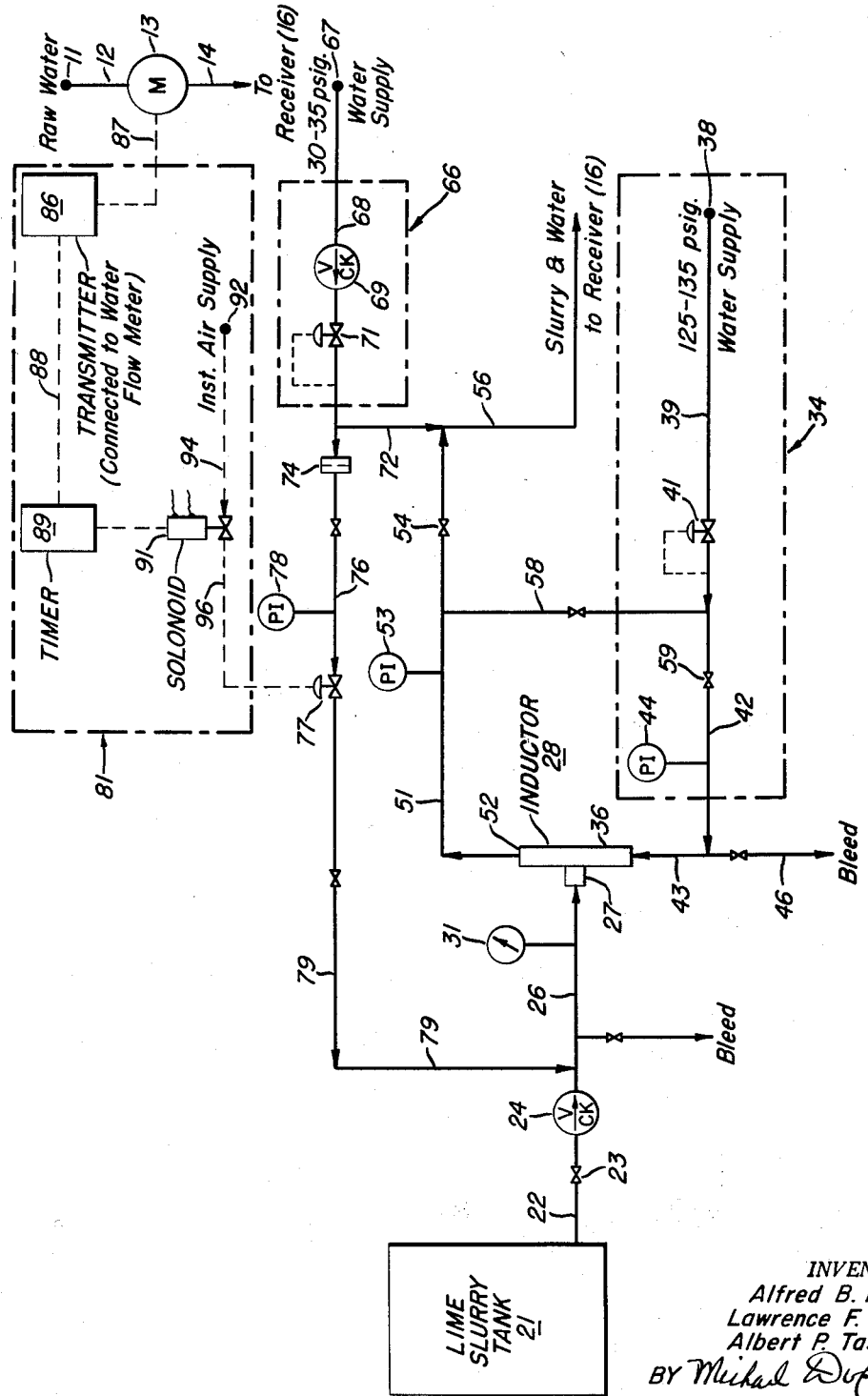
INVENTORS:
Alfred B. Hill
Lawrence F. Becnel
Albert P. Tassin
BY Michael Dufney
ATTORNEY

2,967,538
PROPORTIONING SYSTEM FOR WATER TREATERS

Alfred B. Hill, Metairie, Lawrence F. Becnel, Destrehan, and Albert P. Tassin, La Place, La., assignors to The American Oil Company, New York, N.Y., a corporation of Maryland Filed Dec. 26, 1958, Serial No. 783,016

1 Claim. (Cl. 137—113)

This invention relates to a proportioning system for delivering a liquid at the proper rate into a liquid to be treated, said latter liquid being delivered at a variable rate. In the treating of water for use in steam boilers by the lime or lime soda process, it is necessary to add a definite amount of lime to the raw water. Handling of lime in the form of a slurry is difficult because of erosion on pumps and clogging of valves. Secondarily, it is difficult to proportion the material to the raw water when there is any considerable variation in the rate of flow of the raw water. An object of the invention is to provide a proportioning system for delivering materials to a liquid to be treated, particularly when said liquid to be treated has a variable flow rate. A preferred object is a system for a boiler feed water water treatment using the lime process wherein lime slurry is proportioned to raw water in response to variation in flow of said water, and with a minimum problem with respect to equipment wear and tear. Other objects will become apparent in the course of the detailed description of the invention.

The figure, which forms a part of this specification, shows a preferred embodiment of the proportioning system of the invention, applied to a lime water treating process.

The invention is described in detail in connection with the annexed figure, wherein raw water is withdrawn from a river 11 and is passed by way of line 12 through flow meter 13. From meter 13, the raw water is passed by way of conduit 14 to receiver 16, not shown, where the treatment is carried out. In a particular embodiment, raw water lines 12 and 14 are 16" I.D. The rate of flow of the raw water varies with the make-up requirements in this particular use.

Vessel 21 contains the liquid material to be delivered ultimately to receiver 16. In this embodiment, vessel 21 is a tank for holding a lime slurry; this lime slurry contains about 4 lbs. of lime per gal. of water. A first conduit 22 is connected to vessel 21 in a manner suitable for the flow of liquid material from vessel 21. First conduit 22 is provided with a regular valve 23 and check-valve means 24. Check-valve means 24 is adapted to permit flow only from vessel 21 in the direction of check-valve means 24. A second conduit 26 joins check-valve means 24 and the suction side 27 of jet inductor means 28.

Bleed-off conduit 29 is connected to conduit 26. A compound pressure-vacuum gauge 31 is mounted on conduit 26, communicating with the interior of said conduit 26.

Jet inductor means 28 may be any form of inductor wherein a driving fluid induces entry of another fluid into the inductor. The driving liquid is delivered at essentially constant high pressure by way of a third conduit means 34, which is connected to the driving-liquid entry side 36 of inductor 28. In this embodiment, treated water from source 38, at a pressure of about 125–135 p.s.i.g., is passed by way of line 39 through constant pressure valve 41, valved line 42 and line 43 into entry 36. Pressure regulator 41 provides liquid at 100 p.s.i.g. A pressure gauge 44 is mounted on line 42. Bleed-off line 46 is joined to line 43. In this embodiment, the high pressure water supply lines 39, 42, and 43 are 0.75" I.D. nominal. It is to be understood herein that "high pressure" means a pressure sufficiently greater than the pressure existing in conduit 22 to operate inductor 28 and to induce the required amount of liquid from vessel 21.

A fourth conduit means 51 is connected to discharge side 52 of inductor 28. In this embodiment, conduit means 51 is provided with a pressure gauge 53 and valve 54. The mixture of liquid from tank 21, induced into the inductor by the liquid from conduit 34, passes by way of conduit 51 and conduit 56 to receiver 16.

Provision is made for reverse washing of inductor 28. Water from line 39 may be passed by way of valved line 58, conduit 51 through inductor 28, line 43 and bleed-off line 46. Valves 54 and 59 are closed to permit this operation, while the valve in bleed-off line 46 is open.

A fifth conduit means 66 is adapted for delivery of liquid at an essentially constant low pressure to conduit 26. In this embodiment, treated water from source 67, at 30–35 p.s.i.g., is passed by way of line 68 through check-valve 69 and through pressure regulator 71. Pressure regulator 71 maintains the water supply at 25 p.s.i.g. The main stream of liquid flowing through valve 71 is passed by way of line 72 into line 56 where it meets the slurry-water or water passing through conduit means 51 and is passed on to receiver 16. Sufficient water to keep the slurry lines clean is taken off through orifice 74 and is passed through valved line 76 through control valve 77. A pressure gauge 78 is mounted in line 76. This low pressure water stream is passed through valved line 79 into conduit 26.

Valve 77 is an on-off valve. A cyclic timing means 81 controls the position of on-off valve means 77. Timing means 81 is adapted for activating on-off valve means 77 in response to the rate of flow of liquid through meter 13. In this embodiment, a transmitter 86 is connected by way of circuit 87 with meter 13 and detects any variation in flow rate of water through meter 13. A suitable transmitter for this purpose is a Foxboro Transmitter GW–2 provided with electrical contacts to meter 13. Transmitter 86 passes its signal through circuit 88 to timer 89. Timer 89 is suitably an ATC electrical timer. Timer 89 activates a solenoid operated valve 91, which is mounted on the instrument air supply. Air from source 92 is passed by way of line 94 through solenoid operated valve 91 and line 96 to on-off valve 77.

In a specific embodiment of the invention, water from low pressure water source 67 is passed continuously through lines 68, 72, and 56 to receiver 16. When on-off valve 77 is in the open position, water passes through orifice 74, lines 76, 79, and 26 into inductor 28, and thence in admixture with the high pressure water from source 38 and lines 39, 42, and 43 to receiver 16. The water in line 79 is at a pressure such that the pressure in line 22 is overcome and check-valve 24 is slammed shut. The flow of low pressure water through inductor 28 removes lime slurry deposits.

Timer 89 is provided with a cycle such that the proper amount of lime is proportioned from tank 21 into receiver 16 with the closed position of valve 77 being determined by the requirements in receiver 16, which in turn are sensed by transmitter 86 in response to variation in flow through meter 13. Timer 89 activates solenoid valve 91, which opens and permits air from source 92 to close valve 77. The high pressure water from source 38 enters entry 36 induces flow of lime slurry from tank 21 by way of first conduit means 22 and second conduit means 26. The time of flow of the lime slurry is determined by timer 89 in accordance with the need; the delivery time of slurry is longer or shorter as the corresponding variation in rate of flow through meter 13.

This very simple system has substantially reduced maintenance of pump proportioning and has provided economies with respect to lime usage while simultaneously accurately meeting the treating requirements of the raw water.

Thus having described the invention, what is claimed is:

A proportioning system for delivering materials, which system comprises a vessel adapted to contain the material to be delivered in the form of a liquid; a first conduit connected to said vessel in a manner suitable for the flow of liquid material therefrom, which first conduit is provided with check-valve means adapted to permit flow only from said vessel; a jet inductor means; a second conduit joining said check-valve means and the suction side of said jet inductor means; a third conduit means, provided with a flow controller adapted for delivery of liquid at essentially constant high pressure, connected to the driving-liquid entry side of said jet inductor; a fourth conduit means connected to the discharge side of said jet inductor; a fifth conduit means connected to said second conduit, provided with on-off valve means, a flow controller and adapted for delivery of liquid at essentially constant low pressure, said liquid pressure being such as to hold said check-valve in said first conduit closed; and a cyclic timing means for activating said on-off valve means in said fifth conduit in response to the rate of flow of liquid, which liquid is to be intermingled ultimately with the liquid withdrawn from said vessel.

References Cited in the file of this patent
UNITED STATES PATENTS

| | | |
|---|---|---|
| 1,977,171 | Clithero | Oct. 16, 1934 |
| 2,203,980 | Burt | June 11, 1940 |
| 2,218,773 | Sparling | Oct. 22, 1940 |
| 2,240,164 | Pick | Apr. 29, 1941 |
| 2,826,211 | Reed | Mar. 11, 1958 |